(12) United States Patent
Fukushima

(10) Patent No.: US 9,014,167 B2
(45) Date of Patent: Apr. 21, 2015

(54) OPERATING A WIRELESS COMMUNICATION TERMINAL AFTER ESTABLISHING A SHORT-RANGE CONNECTION WITH ANOTHER WIRELESS COMMUNICATION TERMINAL

(71) Applicant: Olympus Corporation, Tokyo (JP)

(72) Inventor: Keito Fukushima, Tokyo (JP)

(73) Assignee: Olympus Corporation, Tokyo (JP)

( * ) Notice: Subject to any disclaimer, the term of this patent is extended or adjusted under 35 U.S.C. 154(b) by 183 days.

(21) Appl. No.: 13/745,048

(22) Filed: Jan. 18, 2013

(65) Prior Publication Data

US 2013/0128850 A1 May 23, 2013

Related U.S. Application Data

(62) Division of application No. 12/621,827, filed on Nov. 19, 2009, now Pat. No. 8,385,312.

(30) Foreign Application Priority Data

Nov. 21, 2008 (JP) ................................. 2008-298165

(51) Int. Cl.
*H04J 3/00* (2006.01)
*H04W 72/04* (2009.01)
(Continued)

(52) U.S. Cl.
CPC ........... *H04W 72/04* (2013.01); *H04N 1/00278* (2013.01); *H04N 1/00347* (2013.01);
(Continued)

(58) Field of Classification Search
USPC ................. 371/318, 331, 206, 235, 329, 321; 375/285, 225, 296; 455/101, 69, 115.1, 455/127.2, 456.1, 436, 63.1, 522
See application file for complete search history.

(56) References Cited

U.S. PATENT DOCUMENTS 7,126,924 B2 * 10/2006 Suzuki et al. ................. 370/311
7,391,789 B2 6/2008 Kang et al.
(Continued)

FOREIGN PATENT DOCUMENTS

JP 2005130479 A 5/2005
JP 2008-512033 A 4/2008
(Continued)

OTHER PUBLICATIONS

Office Action dated May 10, 2012, issued in U.S. Appl. No. 12/621,827. 14 pages.
(Continued)

*Primary Examiner* — Golam Sorowar
(74) *Attorney, Agent, or Firm* — Westerman, Hattori, Daniels & Adrian, LLP

(57) ABSTRACT

A wireless communication terminal may include: an instruction unit (CPU) that instructs whether a wireless communication serves as host or target; a wireless communication unit that transmits/receives the radio frame to/from a terminal serving as target when receiving an instruction from the instruction unit to serve as host, and transmits/receives the radio frame to/from a terminal serving as host when receiving an instruction from the instruction unit to serve as target; and a setting unit that sets the frame transmission interval of host as the frame transmission interval when receiving an instruction from the instruction unit to serve as host, sets the frame transmission interval of target as the frame transmission interval when receiving an instruction from the instruction unit to serve as target, and transmits a radio frame to a terminal serving as host when the frame transmission interval of target is set.

7 Claims, 15 Drawing Sheets

(51) Int. Cl.
  *H04N 1/00*      (2006.01)
  *H04N 1/327*     (2006.01)
  *H04N 101/00*    (2006.01)

(52) U.S. Cl.
  CPC ....... *H04N1/32702* (2013.01); *H04N 1/32765* (2013.01); *H04N 1/32791* (2013.01); *H04N 2101/00* (2013.01); *H04N 2201/0041* (2013.01); *H04N 2201/0055* (2013.01); *H04N 2201/0082* (2013.01); *H04N 2201/0084* (2013.01)

(56) References Cited

U.S. PATENT DOCUMENTS

| 2005/0070226 A1* | 3/2005 | Rigge ........................... 455/41.3 |
| 2005/0089057 A1  | 4/2005 | Kang et al. |
| 2005/0090263 A1* | 4/2005 | Ebata ............................. 455/453 |
| 2007/0064635 A1* | 3/2007 | Obuchi et al. ................. 370/310 |
| 2008/0212488 A1* | 9/2008 | Okada et al. ................. 370/253 |

FOREIGN PATENT DOCUMENTS

| JP | 2008-512034 A  | 4/2008 |
| WO | 2006/025655 A1 | 3/2006 |
| WO | 2006/025658 A1 | 3/2006 |

OTHER PUBLICATIONS

Japanese Office Action dated Dec. 11, 2012, issued in corresponding Japanese Patent Application No. 2008-298165, (6 pages). With English Translation.

* cited by examiner

| DESTINATION ID | SOURCE ID | CONTROL DATA / CONNECTION REQUEST MESSAGE | DATA | CRC |

| DESTINATION ID | SOURCE ID | CONTROL DATA / CONNECTION PERMISSION MESSAGE | DATA | CRC |

| DESTINATION ID | SOURCE ID | CONTROL DATA / PROBE MESSAGE | DATA | CRC |

| DESTINATION ID | SOURCE ID | CONTROL DATA / DATA | DATA | CRC |

| DESTINATION ID | SOURCE ID | CONTROL DATA / ACK | CRC |

| DESTINATION ID | SOURCE ID | CONTROL DATA | | CRC |
|---|---|---|---|---|
| | | ACK | TRANSMISSION RIGHT REQUEST INFORMATION | |

OPERATING A WIRELESS COMMUNICATION TERMINAL AFTER ESTABLISHING A SHORT-RANGE CONNECTION WITH ANOTHER WIRELESS COMMUNICATION TERMINAL

CROSS REFERENCE TO RELATED APPLICATIONS

This is a divisional application of U.S. patent application Ser. No. 12/621,827, filed on Nov. 19, 2009, which claims the benefit of priority from Japanese Patent Application No. 2008-298165, filed Nov. 21, 2008, the entire contents of each of which are incorporated herein by reference.

BACKGROUND OF THE INVENTION

1. Field of Invention

The present invention relates to a wireless communication terminal.

2. Description of Related Art

As a wireless communication protocol to be used in a wireless communication system, a protocol for transmitting data after performing a procedure of identifying whether or not a wireless link is in use has been disclosed in Japanese Unexamined Patent Application, First Publication No. 2005-130479 (particularly, FIG. 3). In this protocol, the data transmission is performed after exchanging messages between 15 terminals at a data transmitting side and a data receiving side according to a predetermined procedure.

SUMMARY

In a wireless communication terminal in accordance with a preferred embodiment of the present invention, there are radio frames, a message type of some radio frames being "data", a message type of other radio frames being "reception response", a radio frame of which the message type is "data" is defined to as a data frame, a radio frame of which the message type is "reception response" is defined to as an ACK frame, an interval, during which the data frame cannot be transmitted to a counterpart device of a wireless communication counterpart after transmitting a radio frame to the counterpart device or after receiving a radio frame from the counterpart device, is defined as a frame transmission interval, a frame transmission interval of host (IFSh) and a frame transmission interval of target (IFSt) are defined in the frame transmission interval, it is defined that the frame transmission interval of host (IFSh) is shorter than the frame transmission interval of target (IFSt), and the wireless communication terminal includes: an instruction unit (CPU) that instructs whether a wireless communication serves as host or target; a wireless communication unit that transmits/receives the radio frame to/from a terminal serving as target when receiving an instruction from the instruction unit to serve as host, the wireless communication unit transmitting/receiving the radio frame to/from a terminal serving as host when receiving an instruction from the instruction unit to serve as target; and a setting unit that sets the frame transmission interval of host as the frame transmission interval when receiving an instruction from the instruction unit to serve as host, the setting unit setting the frame transmission interval of target as the frame transmission interval when receiving an instruction from the instruction unit to serve as target, the setting unit transmitting a radio frame, which changes the frame transmission interval to the frame transmission interval of target or a frame transmission interval longer than the frame transmission interval of target, to a terminal serving as host when the frame transmission interval of target is set.

Preferably, the setting unit transmits the radio frame when responding to a data frame received from the terminal serving as host if the frame transmission interval of target has been set.

Preferably, the setting unit changes the frame transmission interval to the frame transmission interval of host or a frame transmission interval shorter than the frame transmission interval of host after transmitting the radio frame if the frame transmission interval of target has been set.

Preferably, the setting unit transmits a radio frame, which changes the frame transmission interval to the frame transmission interval of target or a frame transmission interval longer than the frame transmission interval of target, to the terminal serving as target if the frame transmission interval of host has been set.

Preferably, the setting unit transmits a probe message frame as the radio frame to the terminal serving as target if the frame transmission interval of host has been set.

Preferably, the setting unit transmits the radio frame at a predetermined interval to the terminal serving as target if the frame transmission interval of host has been set.

Preferably, the setting unit changes the frame transmission interval to the frame transmission interval of target or a frame transmission interval longer than the frame transmission interval of target after transmitting the radio frame if the frame transmission interval of host has been set.

BRIEF DESCRIPTION OF THE DRAWINGS

The above features and advantages of the present invention will be more apparent from the following detailed description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, the embodiments of the present invention will be described with reference to the drawings.

Figure 1:
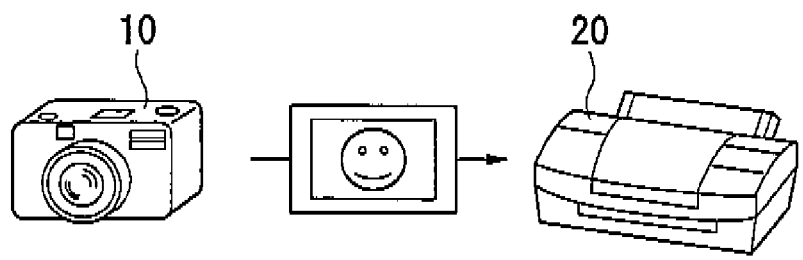
FIG. 1 is a configuration diagram showing a configuration of a wireless communication system according to an embodiment of the present invention.

FIG. 1 shows a configuration of a wireless communication system according to an embodiment of the present invention. The wireless communication system includes an electronic camera 10 as a type of wireless communication terminal having a wireless communication function, and a printer 20. In this embodiment, a use is assumed in which a user sends a print request to the printer 20 by operating the electronic camera 10, but the present invention is applicable to other uses.

Figure 4:
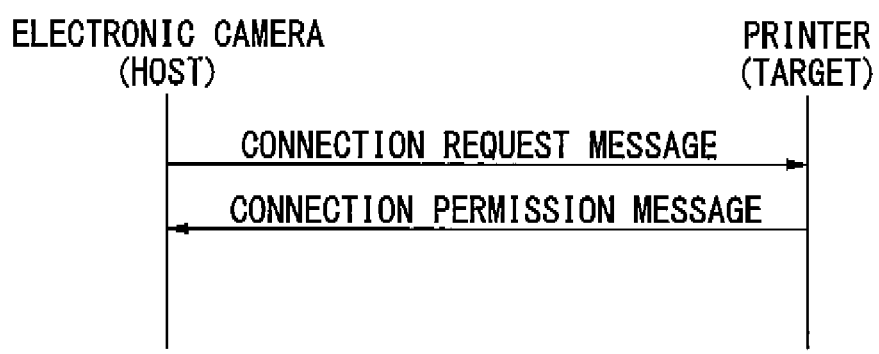
FIG. 4 is a sequence diagram showing a relationship between a host and a target according to an embodiment of the present invention.

The electronic camera 10 in a data link layer serves as a host and the printer 20 serves as a target. The host is a device which transmits a wireless communication connection request to a connection counterpart, and the target is a device which receives the wireless communication connection request from a connection counterpart. As shown in FIG. 4, the electronic camera 10 as the host transmits a connection request message to the printer 20 as the target, and the printer 20 transmits a connection permission message to the electronic camera 10 in response to the connection request message from the electronic camera 10.

Figure 2:
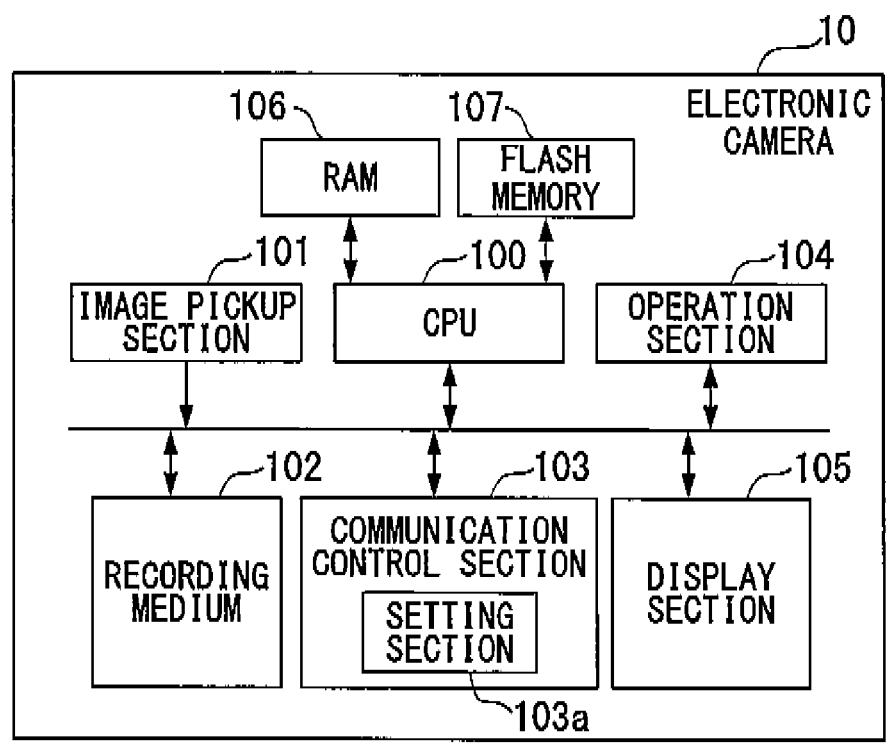
FIG. 2 is a block diagram showing a configuration of an electronic camera according to an embodiment of the present invention.

FIG. 2 shows a configuration of the electronic camera 10. The electronic camera 10 is configured by a CPU 100, an image pickup section 101, a recording medium 102, a communication control section 103, an operation section 104, a display section 105, a RAM 106, and a flash memory 107.

The CPU 100 controls the overall operation of each section of the electronic camera 10 by reading and running a control program recorded in the flash memory 107 and reading and writing various data from and to the RAM 106. Besides the control program, image pickup parameters or communication parameters (data transmission protocol information and the like) are recorded in the flash memory 107.

The image pickup section 101 generates an image pickup signal by photographing an object, and creates image data by performing various image processing operations. The created image data is recorded in the recording medium 102. A memory card attachable to, or detachable from, the electronic camera 10 or a hard disk fixed to the electronic camera 10 is used in the recording medium 102.

The communication control section 103 is a wireless communication interface which exchanges captured image data or the like with an external device (a PC, a printer, an external recording device, or the like). The wireless communication interface is an interface which performs wireless data communication, such as WLAN, Bluetooth, IrDA, TransferJET, or WiMedia. The communication control section 103 has a setting section 103a which sets a frame transmission interval to be described later.

The operation section 104 has an operation switch or the like for allowing the user to input an instruction regarding the operation of the electronic camera 10. The display section 105 displays an image based on image data read from the recording medium 102, a user interface screen, or the like.

Figure 3:
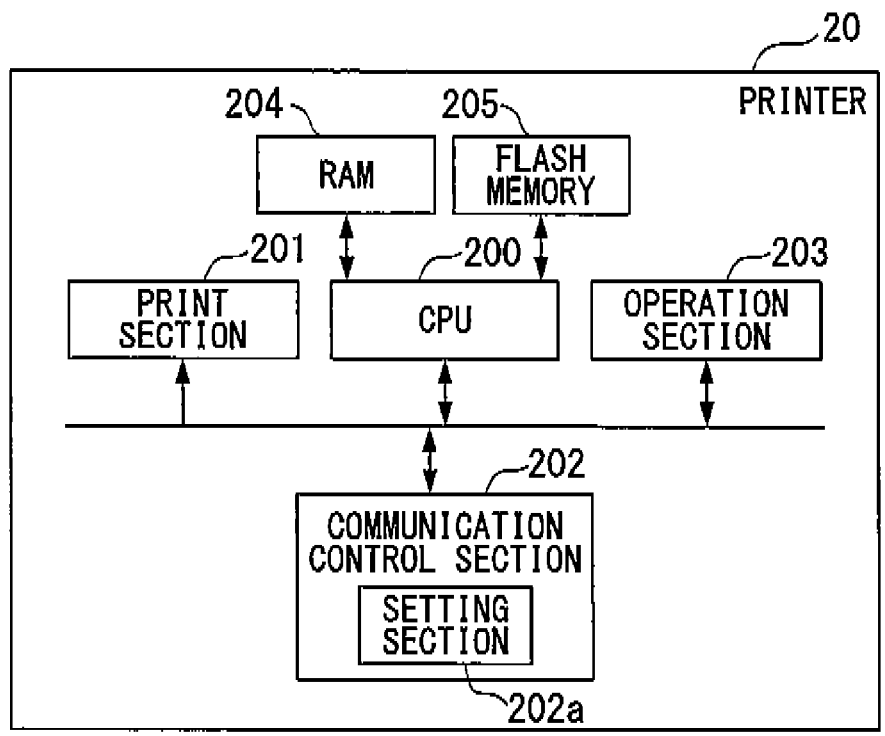
FIG. 3 is a block diagram showing a configuration of a printer according to an embodiment of the present invention.

FIG. 3 shows a configuration of the printer 20. The printer 20 includes a CPU 200, a print section 201, a communication control section 202, an operation section 203, a RAM 204, and a flash memory 205.

The CPU 200 controls the overall operation of each section of the printer 20 by reading and running a control program recorded in the flash memory 205 and reading and writing various data from and to the RAM 204. Besides the control program, print parameters or communication setting parameters (data transmission protocol information and the like) are recorded in the flash memory 205.

The print section 201 prints on paper based on print data received by the communication control section 202 from an external device (an electronic camera, a PC, or the like). The communication control section 202 is a wireless communication interface which exchanges print data or the like with an external device. The communication control section 202 has a setting section 202a which sets a frame transmission interval to be described later. The operation section 203 has an operation switch or the like for allowing the user to input an instruction regarding the operation of the printer 20.

Figure 5:
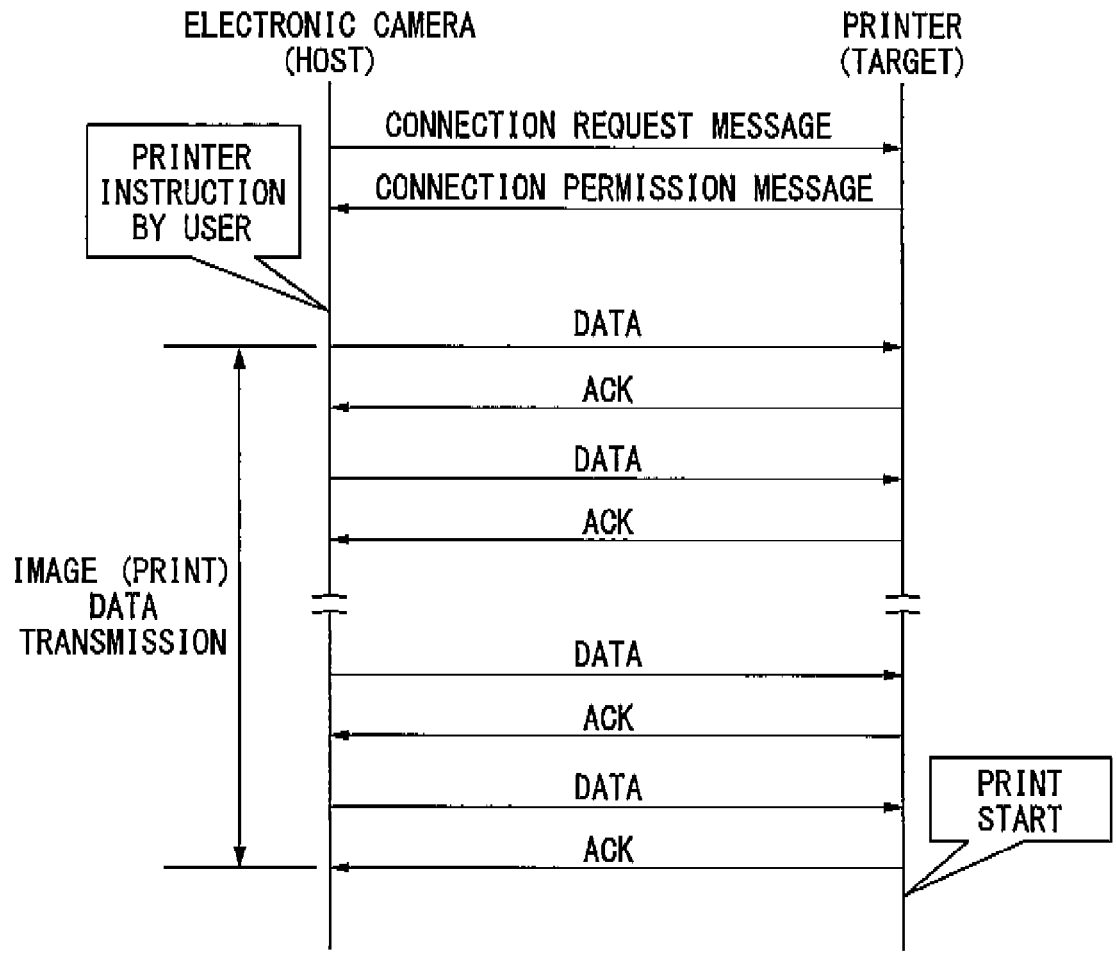
FIG. 5 is a sequence diagram showing a communication procedure according to an embodiment of the present invention.

When the printer 20 performs printing based on image data kept in the electronic camera 10, data is transmitted in a communication sequence shown in FIG. 5. After a connection is established by the transmission of a connection request message from the electronic camera 10 to the printer 20 and the transmission of a connection permission message from the printer 20 to the electronic camera 10, the electronic camera 10 starts the transmission of image data (print data) when the user inputs a print instruction to the electronic camera 10. The image data is divided into predetermined unit data and transmitted to the printer 20. When the data is received from the electronic camera 10, the printer 20 transmits an ACK as a reception response to the electronic camera 10. When the transmission of all data is completed, the printer 20 starts the printing.

Figure 6:
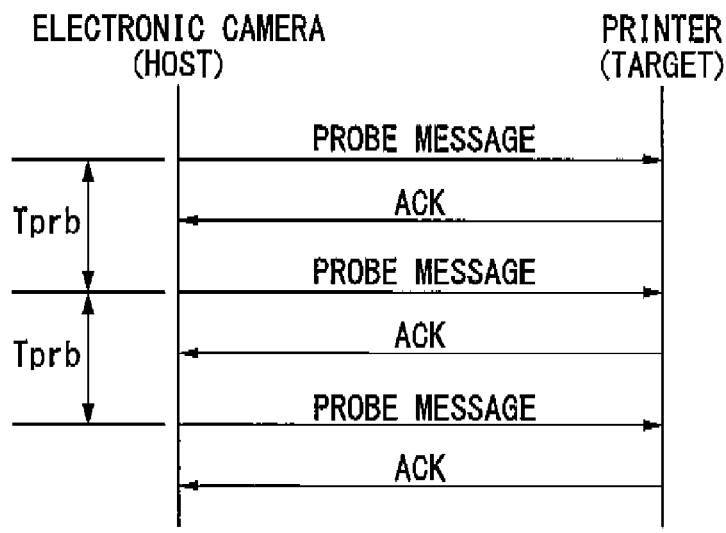
FIG. 6 is a sequence diagram showing a communication procedure according to an embodiment of the present invention.

After the connection to the printer 20 is established, the electronic camera 10 transmits a probe message to the printer 20 at a predetermined transmission interval (Tprb) as shown in FIG. 6 so as to detect whether or not the printer 20 is connected. When the probe message is received, the printer 20 transmits an ACK as a reception response to the electronic camera 10. The electronic camera 10 determines that the printer 20 is connected when the ACK could have been received from the printer 20, and determines that the printer 20 is not connected when the ACK could not have been received from the printer 20.

In this embodiment, the wireless communication is performed in a communication sequence in which both the communication sequence shown in FIG. 5 and the communication sequence shown in FIG. 6 are combined.

Figures 7, 8, 9, 10, 11, 12:
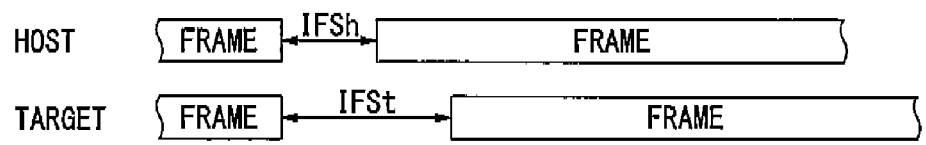
FIG. 7 is a reference diagram showing a structure of a connection request message frame according to an embodiment of the present invention.
FIG. 8 is a reference diagram showing a structure of a connection permission message frame according to an embodiment of the present invention.
FIG. 9 is a reference diagram showing a structure of a probe message frame according to an embodiment of the present invention.
FIG. 10 is a reference diagram showing a structure of a data frame according to an embodiment of the present invention.
FIG. 11 is a reference diagram showing a structure of an ACK frame according to an embodiment of the present invention.
FIG. 12 is a reference diagram showing data transmission intervals of the host and the target according to an embodiment of the present invention.

Next, the structures of various radio frames to be used in this embodiment will be described. FIG. 7 shows a structure of a connection request message frame for transmitting a connection request to a device of a communication counterpart (hereinafter, referred to as a counterpart device). A destination ID is an identifier (ID) of a counterpart as a message destination. In this regard, when the counterpart device is not specified when the connection is requested, a special identifier (ID) such as FF-FF-FF-FF-FF-FF-FF-FF is set to the destination ID. A source ID is an identifier (ID) of a local device. Control data indicates a type of message. When the connection is requested, a "connection request message" is set. In a data field, various data is set if necessary. CRC indicates code data for error correction.

FIG. 8 shows a structure of a connection permission message frame for reporting connection permission to a counterpart device transmitting a connection request. The destination ID, the source ID, the data, and the CRC are the same as those of the connection request message. In a message type of control data, a "connection permission message" is set.

FIG. 9 shows a structure of a probe message frame for detecting whether or not a counterpart device is connected. The destination ID, the source ID, the data, and the CRC are the same as those of the connection request message. In a message type of control data, a "probe message" is set.

FIG. 10 shows a structure of a data frame to be used to transmit data to a counterpart device. The destination ID, the source ID, the data, and the CRC are the same as those of the connection request message. In a message type of control data, "data" is set. In a data frame to be transmitted from the electronic camera 10 to the printer 20, print data is set in the data field. In a data frame to be transmitted from the printer 20 to the electronic camera 10, data regarding the status of the printer 20 or the like is set in the data field.

FIG. 11 shows a structure of an ACK frame for notifying a counterpart device of the fact that a radio frame transmitted from the counterpart device has been received. The destination ID, the source ID, and the CRC are the same as those of the connection request message. In a message type of control data, an "ACK" is set.

Next, the priority of data transmission under an assumption of this embodiment will be described. FIG. 12 shows a frame transmission interval (IFS: Interframe Space) as the time between radio frames. A host and a target may not transmit a radio frame to the counterpart device when a predetermined frame transmission interval has not elapsed after transmitting a radio frame to the counterpart device or after receiving a radio frame from the counterpart device. The frame transmission interval of the host is IFSh, the frame transmission interval of the target is IFSt, and IFSh<IFSt. The frame transmission intervals IFSh and IFSt are set by the communication control section 103 (the setting section 103a) of the electronic camera 10 and the communication control section 202 (the setting section 202a) of the printer 20.

Figure 13:
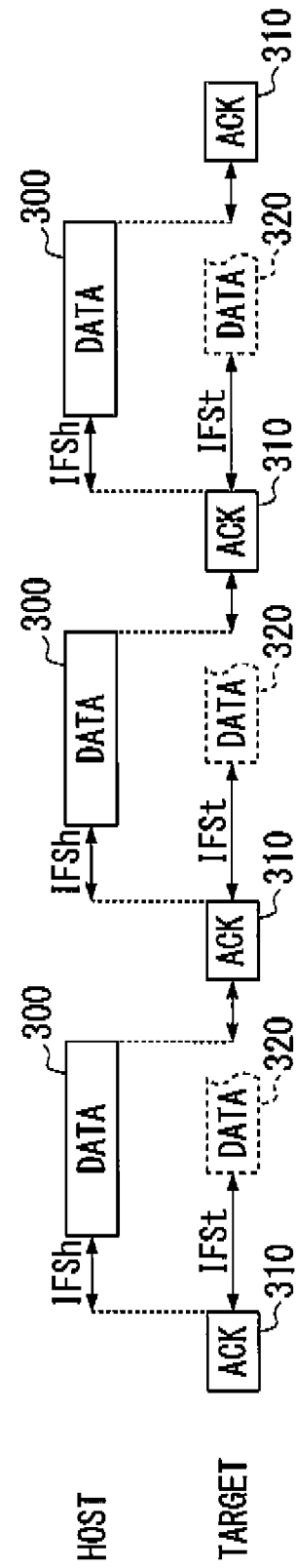
FIG. 13 is a reference diagram showing operations of the host and the target under an assumption of an embodiment of the present invention.

As shown in FIG. 13, when IFSh has elapsed after transmitting a previous data frame 300 and receiving an ACK frame 310 from the target, the host transmits the next data frame 300. On the other hand, when a predetermined frame transmission interval (SIFS: Short Interframe Space) has elapsed after receiving the data frame 300, the target transmits the ACK frame 310 to the host. Thereafter, the target waits for a data frame 320 to be transmitted after IFSt has elapsed, but the target may not transmit the data frame 320 since the data frame 300 is transmitted from the host. Therefore, the host has a higher data transmission priority than the target, and the data is unilaterally transmitted from the host to the target. In this embodiment, a transmission time of a radio frame between the electronic camera 10 and the printer 20 is less than a frame transmission interval and is assumed to be negligible.

Next, the operation of the wireless communication system according to this embodiment will be described.

<First Operation Example>

Figure 14:
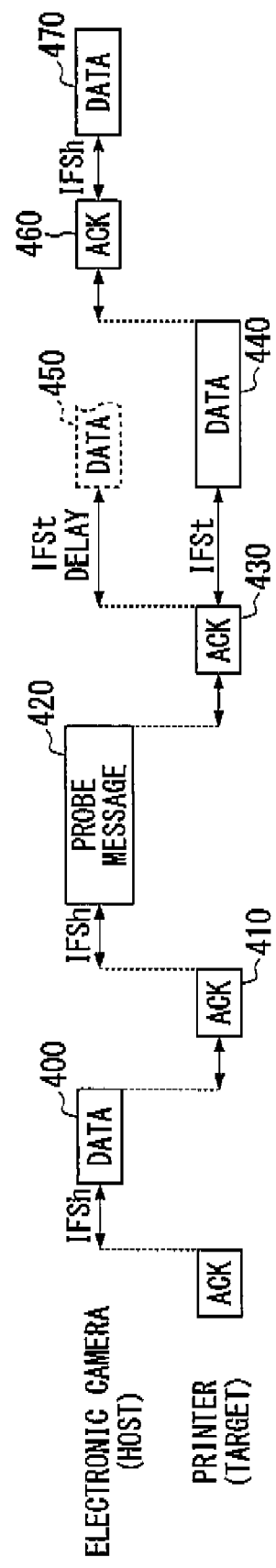
FIG. 14 is a reference diagram showing operations (a first operation example) of the electronic camera and the printer according to an embodiment of the present invention.

First, a first operation example will be described. FIG. 14 shows operations of the electronic camera 10 and the printer 20 according to the first operation example. When the electronic camera 10 transmits a data frame 400, the printer 20 transmits an ACK frame 410 as a reception response to the electronic camera 10. When Tprb has elapsed after establishing the connection or when Tprb has elapsed after transmitting a previous probe message, the electronic camera 10 transmits a probe message frame 420 to the printer 20.

When the probe message frame 420 is received, the printer 20 transmits an ACK frame 430 to the electronic camera 10. When the ACK frame 430 as a reception response corresponding to the probe message frame 420 is received, the electronic camera 10 changes the frame transmission interval from IFSh to IFSt. In the printer 20, data to be transmitted to the electronic camera 10 is generated at a transmission time of the ACK frame 430. When IFSt has elapsed after transmitting the ACK frame 430, the printer 20 transmits a data frame 440 to the electronic camera 10.

When IFSt has elapsed after receiving the ACK frame 430, the electronic camera 10 may not transmit a data frame 450 since the data frame 440 is received. If the printer 20 does not transmit the data frame 440, the electronic camera 10 is able to transmit the data frame 450. When the data frame 440 is received, the electronic camera 10 transmits an ACK frame 460 as a reception response to the printer 20. When IFSh has elapsed after transmitting the ACK frame 460, the electronic camera 10 transmits a data frame 470 to the printer 20.

According to the above operation, when an ACK frame for a probe message frame has been received, the electronic camera 10 changes the frame transmission interval from IFSh to IFSt, so that the printer 20 is able to transmit a data frame by taking an opportunity to transmit data. The electronic camera 10 may change the frame transmission interval to a longer time interval than IFSt. Thereby, the data transmission collision between the electronic camera 10 and the printer 20 may be avoided more reliably. As another method of providing the data transmission opportunity for the printer 20, the electronic camera 10 may change the frame transmission interval from IFSh to IFSt at an arbitrary timing without receiving the ACK frame for the probe message frame. In the case where it is not desirable for the electronic camera 10 to provide the data transmission opportunity for the printer 20, the frame transmission interval may be set to IFSh even when the ACK frame for the probe message frame has been received.

Hereinafter, the detailed operations of the electronic camera 10 and the printer 20 will be described. In the electronic camera 10, the CPU 100 instructs the communication control section 103 to serve as the host before the connection to the printer 20 is established, and the setting section 103a of the communication control section 103 sets a predetermined frame transmission interval (IFSh). In the printer 20, the CPU 200 instructs the communication control section 202 to serve as the target before the connection to the electronic camera 10 is established, and the setting section 202a of the communication control section 202 sets a predetermined frame transmission interval (IFSt).

Figure 15:
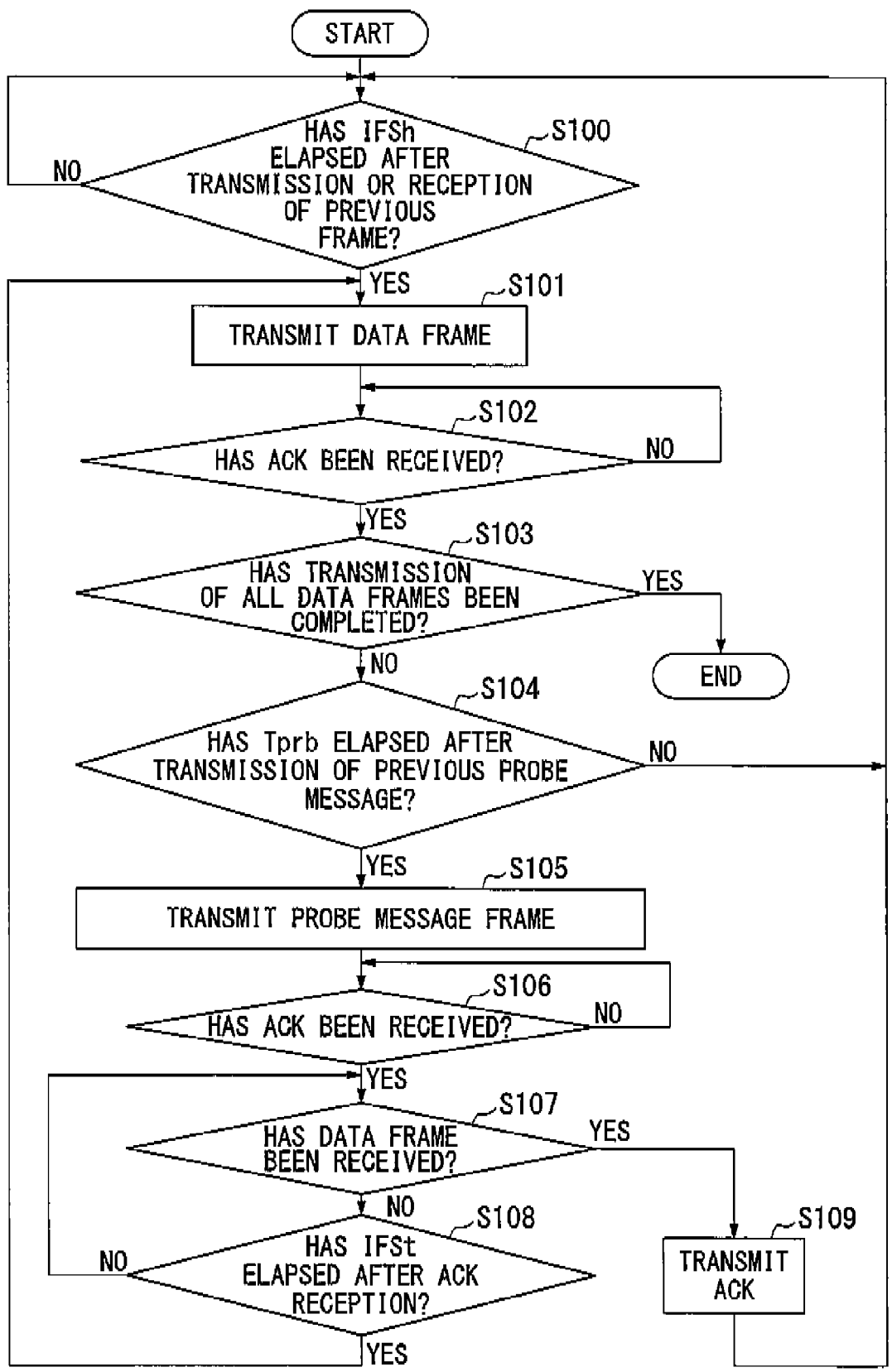
FIG. 15 is a flowchart showing a procedure of the operation (the first operation example) of the electronic camera according to an embodiment of the present invention.

FIG. 15 shows an operation of the electronic camera 10 after establishing the connection to the printer 20.

When a radio frame is received from the printer 20 during the operation shown in FIG. 15, the communication control section 103 stores the radio frame in the RAM 106. Data to be transmitted is stored in the RAM 106 by the CPU 100. The communication control section 103 performs transmission by dividing the data into frames (data frames) having a predetermined size. First, the communication control section 103 determines whether or not IFSh has elapsed after transmitting a previous radio frame to the printer 20 or receiving a previous radio frame from the printer 20 (step S100). The frame transmission interval IFSh to be used for the determination of step S100 is set by the setting section 103a.

When IFSh has not elapsed, the communication control section 103 repeats the determination of step S100. When IFSh has elapsed, the communication control section 103 transmits a data frame to the printer 20 by wireless communication (step S101). Subsequently, the communication control section 103 determines whether or not an ACK frame has been received (step S102).

When the ACK frame has not been received, the communication control section 103 repeats the determination of step S102. When the ACK frame has been received, the communication control section 103 determines whether or not the transmission of all data frames has been completed (step S103). When the ACK frame could not have been received even when a predetermined time has elapsed, the process may be terminated due to communication error. When the transmission of all data frames has been completed, a series of processes related to the data transmission ends. When a non-transmitted data frame remains, the communication control section 103 determines whether or not Tprb has elapsed after the transmission of a previous probe message frame (step S104). The transmission interval Tprb of the probe message frame to be used for the determination of step S104 is set by the setting section 103a.

When Tprb has not elapsed, the communication control section 103 repeats the determination of step S100. When Tprb has elapsed, the communication control section 103 transmits the probe message frame to the printer 20 by wireless communication (step S105). Subsequently, the communication control section 103 determines whether or not an ACK frame has been received (step S106).

When the ACK frame has not been received, the communication control section 103 repeats the determination of step S106. When the ACK frame could not have been received even when a predetermined time has elapsed, the process may be terminated due to communication error. When the ACK frame has been received, the communication control section 103 determines whether or not a data frame has been received (step S107). When the data frame has been received, the communication control section 103 transmits the ACK frame to the printer 20 by wireless communication (step S109). Subsequently, the communication control section 103 repeats the determination of step S100. When the data frame has not been received, the communication control section 103 determines whether or not IFSt has elapsed after receiving the ACK frame (step S108). The frame transmission interval IFSt to be used for the determination of step S108 is set by the setting section 103a.

When IFSt has not elapsed, the communication control section 103 repeats the determination of step S107. When IFSt has elapsed, the communication control section 103 performs step S101 to transmit the next data frame.

As described above, when the electronic camera 10 transmits a probe message frame (step S105) and receives an ACK frame (step S106), the frame transmission interval is changed from IFSh to IFSt (step S108). Thereby, it is possible to provide an opportunity to transmit data for the printer 20.

Figure 16:
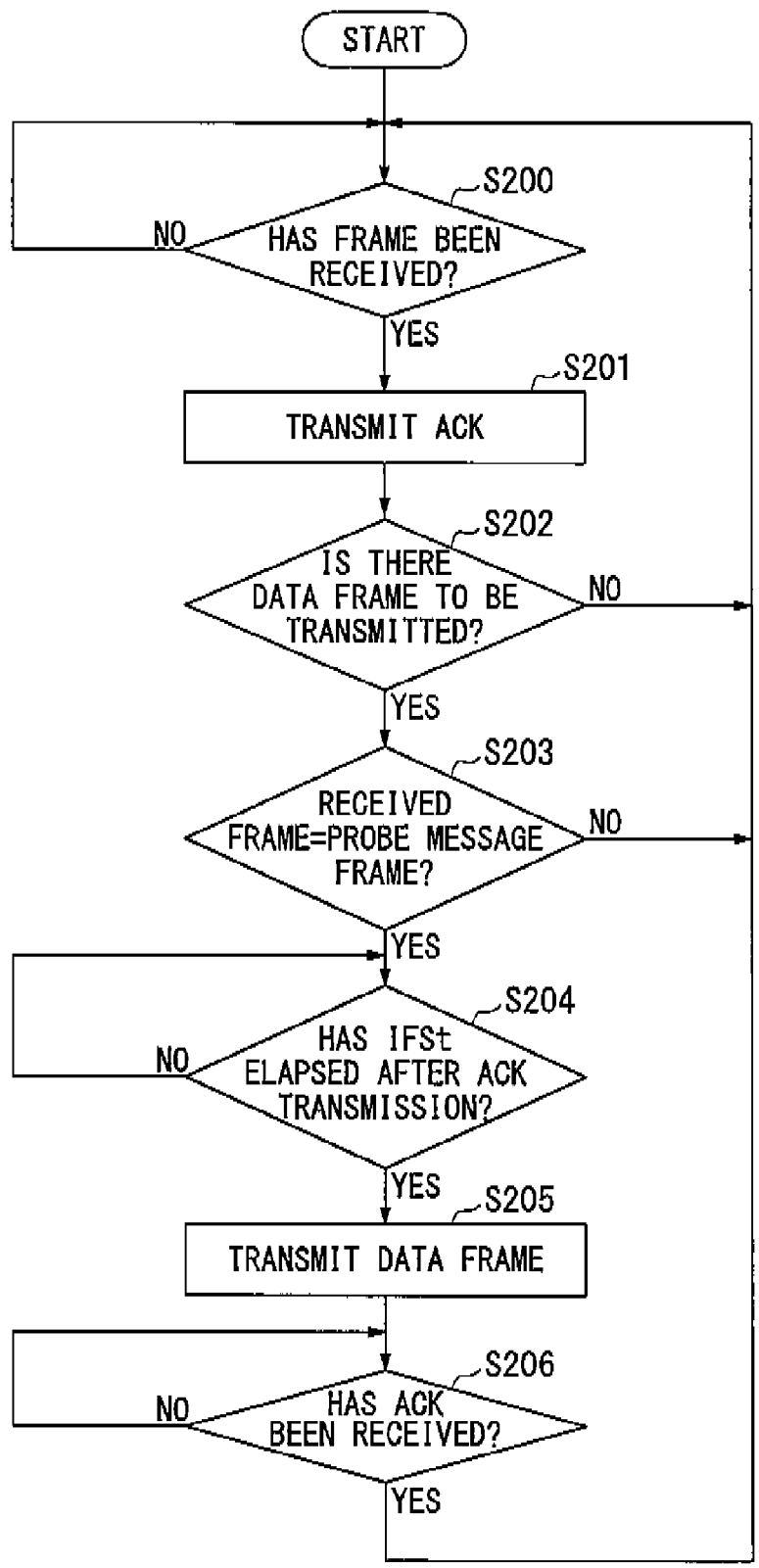
FIG. 16 is a flowchart showing a procedure of the operation (the first operation example) of the printer according to an embodiment of the present invention.

FIG. 16 shows an operation of the printer 20 after establishing the connection to the electronic camera 10.

When a radio frame is received from the electronic camera 10 during the operation shown in FIG. 16, the communication control section 202 stores the radio frame in the RAM 204. Data to be transmitted is stored in the RAM 204 by the CPU 200. The communication control section 202 performs transmission by dividing the data into frames (data frames) having a predetermined size. First, the communication control section 202 determines whether or not a radio frame has been received (step S200).

When the radio frame has not been received, the communication control section 202 repeats the determination of step S200. When the radio frame has been received, the communication control section 202 transmits an ACK frame to the electronic camera 10 by wireless communication (step S201). Subsequently, the communication control section 202 determines whether or not a data frame intended to be transmitted to the electronic camera 10 exists (step S202).

When a data frame intended to be transmitted does not exist, the communication control section 202 repeats the determination of step S200. When the data frame intended to be transmitted exists, the communication control section 202 determines whether or not the received radio frame is a probe message frame (step S203).

When the received radio frame is not the probe message frame, the communication control section 202 repeats the determination of step S200. When the received radio frame is the probe message frame, the communication control section 202 determines whether or not IFSt has elapsed after transmitting the ACK frame in step S201 (step S204). The frame transmission interval IFSt to be used for the determination of step S204 is set by the setting section 202a.

When IFSt has not elapsed, the communication control section 202 repeats the determination of step S204. When IFSt has elapsed, the communication control section 202 transmits a data frame to the electronic camera 10 by wireless communication (step S205). Subsequently, the communication control section 202 determines whether or not the ACK frame has been received (step S206).

When the ACK frame has not been received, the communication control section 202 repeats the determination of step S206. When the ACK frame has been received, the communication controls section 202 repeats the determination of step S200. When the ACK frame could not have been received even when a predetermined time has elapsed, the process may be terminated due to communication error.

As described above, when IFSt has elapsed after transmitting the ACK frame for the probe message frame (step S204), the printer 20 is able to transmit a data frame (step S205).

<Second Operation Example>

Figure 17:
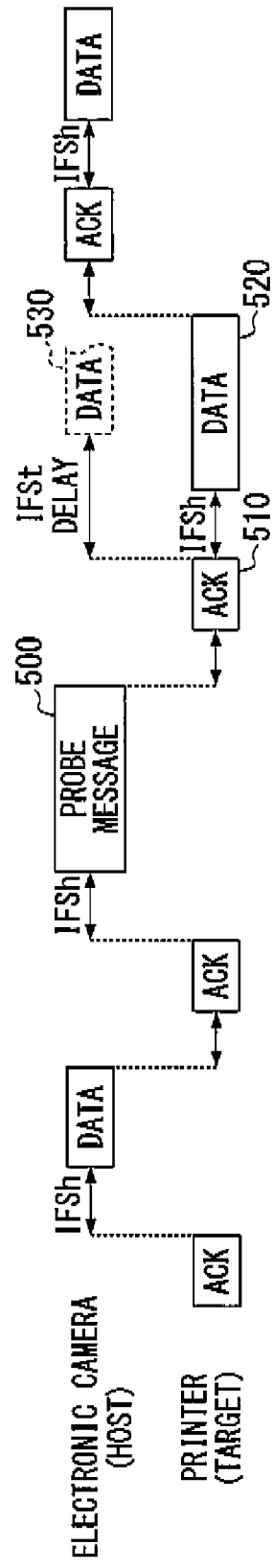
FIG. 17 is a reference diagram showing operations (a second operation example) of the electronic camera and the printer according to an embodiment of the present invention.

Next, a second operation example will be described. FIG. 17 shows operations of the electronic camera 10 and the printer 20 according to the second operation example. The difference from the first operation example shown in FIG. 14 is that the frame transmission interval is changed to IFSh until a data frame 520 is transmitted after the printer 20 transmits an ACK frame 510 as a reception response corresponding to a probe message frame 500 to the electronic camera 10.

When IFSh has elapsed after transmitting the ACK frame 510, the printer 20 transmits the data frame 520 to the electronic camera 10. Since the data frame 520 is received before IFSt has elapsed after receiving the ACK frame 510, the electronic camera 10 may not transmit a data frame 530. If the printer 20 does not transmit the data frame 520, the electronic camera 10 is able to transmit the data frame 530.

According to the above operation, when an ACK frame for a probe message frame has been received, the printer 20 changes the frame transmission interval from IFSt to IFSh, so that the printer 20 is able to transmit a data frame by taking an opportunity to transmit data. The printer 20 may change the frame transmission interval to a shorter time interval than IFSh. Thereby, the data transmission collision between the electronic camera 10 and the printer 20 may be avoided more reliably. As another method of providing the data transmission opportunity for the printer 20, the printer 20 may change the frame transmission interval from IFSt to IFSh at an arbitrary timing without transmitting the ACK frame for the probe message frame.

The detailed operation of the electronic camera 10 is the same as the operation shown in FIG. 15. The detailed operation of the printer 20 is the same as the operation shown in FIG. 16, but they are different in that the time to be used for the determination of step S204 is IFSh, not IFSt.

Figures 18, 19:
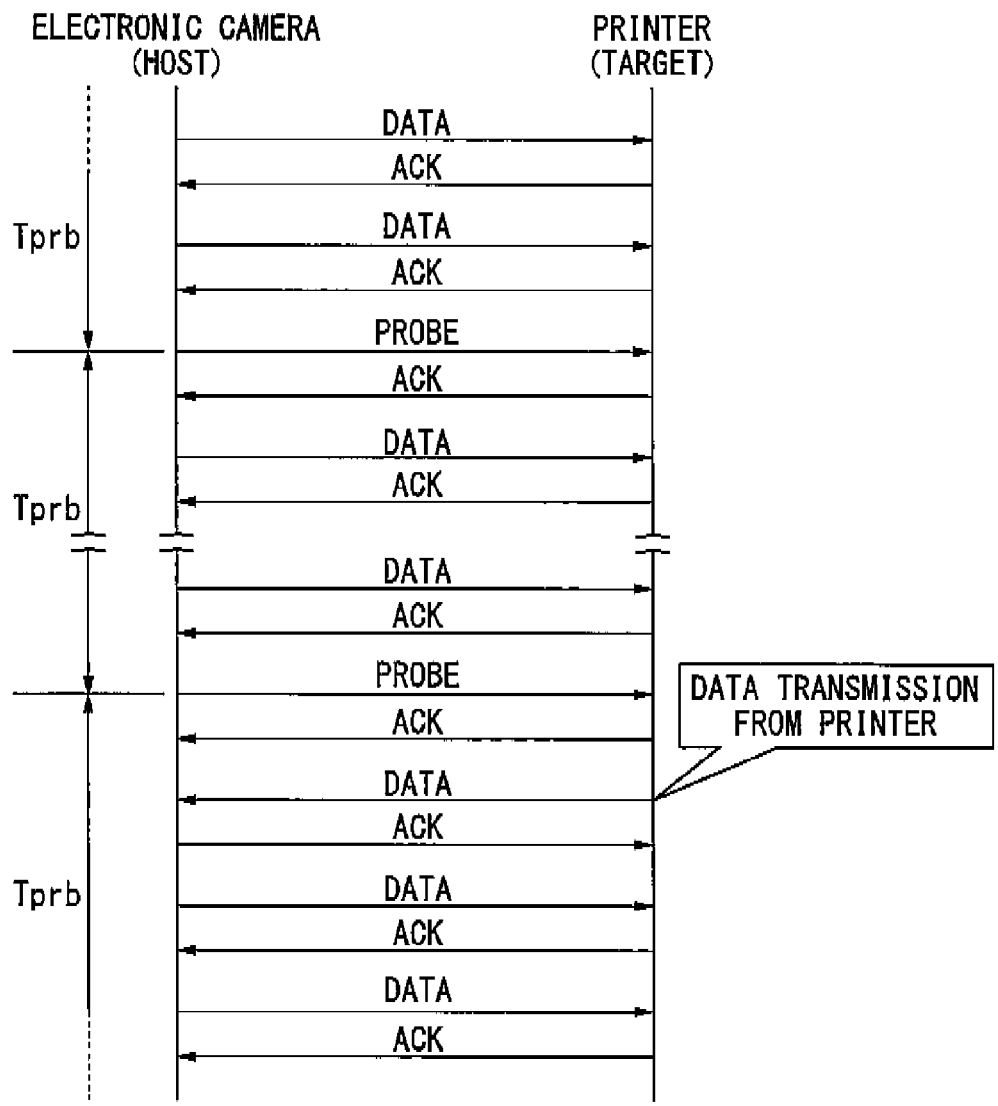
FIG. 18 is a sequence diagram showing operations (the first and second operation examples) of the electronic camera and the printer according to an embodiment of the present invention.
FIG. 19 is a reference diagram showing a structure (a third operation example) of an ACK frame according to an embodiment of the present invention.

FIG. 18 shows communication sequences of the electronic camera 10 and the printer 20 according to the first and second operation examples. The electronic camera 10 transmits a probe message frame at a predetermined interval while continuously transmitting a data frame to the printer 20. When a data frame intended to be transmitted exists, the printer 20 is able to transmit the data frame to the electronic camera 10 after transmitting an ACK frame for the probe message frame to the electronic camera 10.

<Third Operation Example>

Next, a third operation example will be described. The structure of an ACK frame in the third operation example is different from those of the first and second operation examples. FIG. 19 shows the structure of the ACK frame in the third operation example. In a control data field, transmission right request information is set along with a message type (ACK). The transmission right request information indicates the presence or absence of a transmission right request for a data frame. When "0" is set in the transmission right request information, the transmission right request information indicates that the transmission right is not requested. When "1" is set in the transmission right request information, the transmission right request information indicates that the transmission right is requested.

Figure 20:
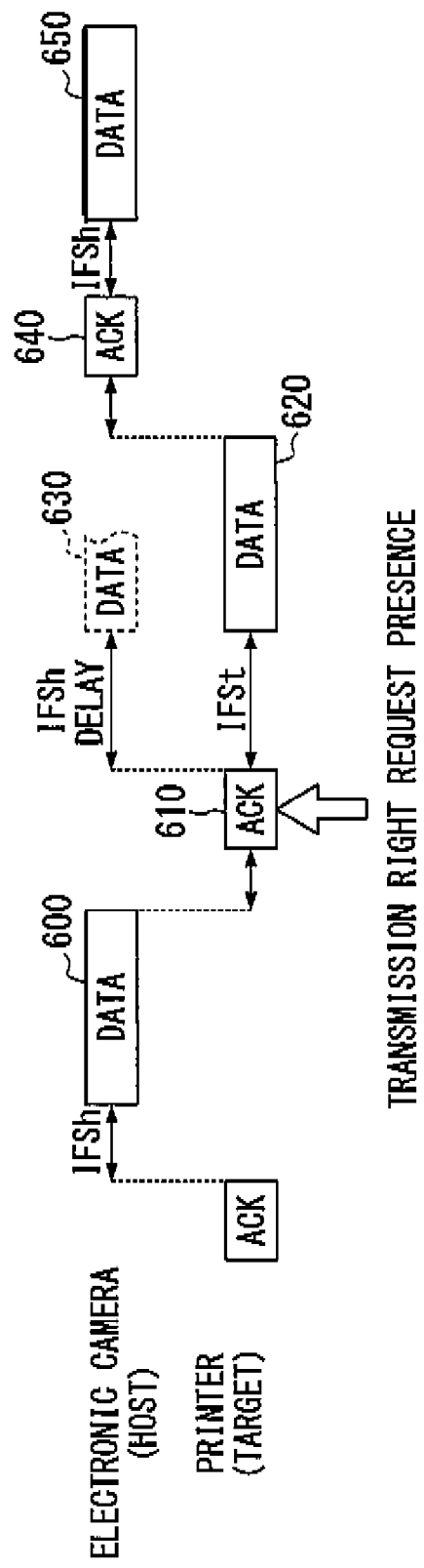
FIG. 20 is a reference diagram showing operations (the third operation example) of the electronic camera and the printer according to an embodiment of the present invention.

FIG. 20 shows operations of the electronic camera 10 and the printer 20 according to the third operation example. When the electronic camera 10 transmits a data frame 600, the printer 20 transmits an ACK frame 610 as a reception response to the electronic camera 10. Since data to be transmitted to the electronic camera 10 is generated at a transmission time of the ACK frame 610 in the printer 20, "1" is set in the transmission right request information of the ACK frame 610. When the ACK frame 610 indicating the transmission right request is received, the electronic camera 10 changes the frame transmission interval from IFSh to IFSt.

When IFSt has elapsed after transmitting the ACK frame 610, the printer 20 transmits a data frame 620 to the electronic camera 10. Since the data frame 620 is received when IFSt has elapsed after transmitting the ACK frame 610, the electronic camera 10 may not transmit a data frame 630. If the printer 20 does not transmit the data frame 620, the electronic camera 10 is able to transmit the data frame 630. When the data frame 620 is received, the electronic camera 10 transmits an ACK frame 640 as a reception response to the printer 20. When IFSh has elapsed after transmitting the ACK frame 640, the electronic camera 10 transmits a data frame 650 to the printer 20.

According to the above operation, when an ACK frame indicating a transmission right request has been received, the electronic camera 10 changes the frame transmission interval from IFSh to IFSt, so that the printer 20 is able to transmit a data frame by taking an opportunity to transmit data. The electronic camera 10 may change the frame transmission interval to a longer time interval than IFSt. Thereby, the data transmission collision between the electronic camera 10 and the printer 20 may be avoided more reliably. As another method of providing the data transmission opportunity for the printer 20, the electronic camera 10 may change the frame transmission interval from IFSh to IFSt at an arbitrary timing without receiving the ACK frame indicating the transmission right request. In the case where it is not desirable for the electronic camera 10 to provide the data transmission opportunity for the printer 20, the frame transmission interval may be set to IFSh even when the ACK frame indicating the transmission right request has been received.

Hereinafter, the detailed operations of the electronic camera 10 and the printer 20 will be described. In the electronic camera 10, the CPU 100 instructs the communication control section 103 to serve as the host before the connection to the printer 20 is established, and the communication control section 103 (the setting section 103a) sets a predetermined frame transmission interval (IFSh). In the printer 20, the CPU 200 instructs the communication control section 202 to serve as the target before the connection to the electronic camera 10 is established, and the communication control section 202 sets a predetermined frame transmission interval (IFSt).

Figure 21:
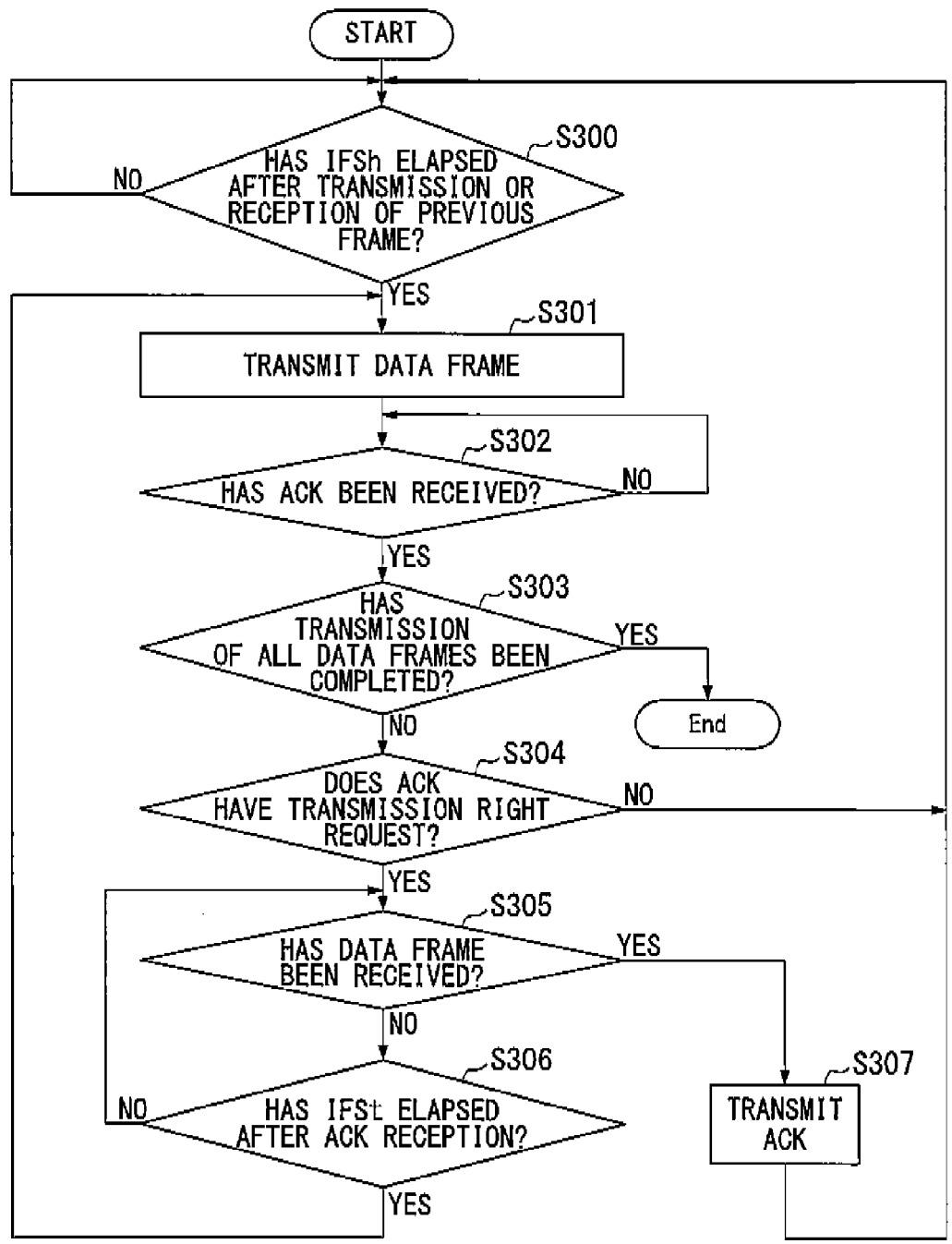
FIG. 21 is a flowchart showing a procedure of the operation (the third operation example) of the electronic camera according to an embodiment of the present invention.

FIG. 21 shows an operation of the electronic camera 10 after establishing the connection to the printer 20.

When a radio frame is received from the printer 20 during the operation shown in FIG. 21, the communication control section 103 stores the radio frame in the RAM 106. Data to be transmitted is stored in the RAM 106 by the CPU 100. The communication control section 103 performs transmission by dividing the data into frames (data frames) having a predetermined size. Since the process of steps S300 to S303 is the same as the process of steps S100 to S103 of FIG. 15, a description thereof is omitted.

When a non-transmitted data frame remains in the determination of step S303, the communication control section 103 determines whether or not transmission right request information indicates a transmission right request by referring to the transmission right request information among control data of a received ACK frame (step S304).

When a value set in the transmission right request information is "0", the transmission right request information indicates that the transmission right is not requested. In this case, the communication control section 103 repeats the determination of step S300. When a value set in the transmission right request information is "1", the transmission right request information indicates that the transmission right is requested. In this case, the process proceeds to step S305. Since the process of steps S305 to S307 is the same as the process of steps S107 to S109 of FIG. 15, a description thereof is omitted.

As described above, when an ACK frame indicating the transmission right request is received (step S304), the electronic camera 10 changes the frame transmission interval from IFSh to IFSt (step S306).

Thereby, it is possible to provide an opportunity to transmit data for the printer 20.

Figure 22:
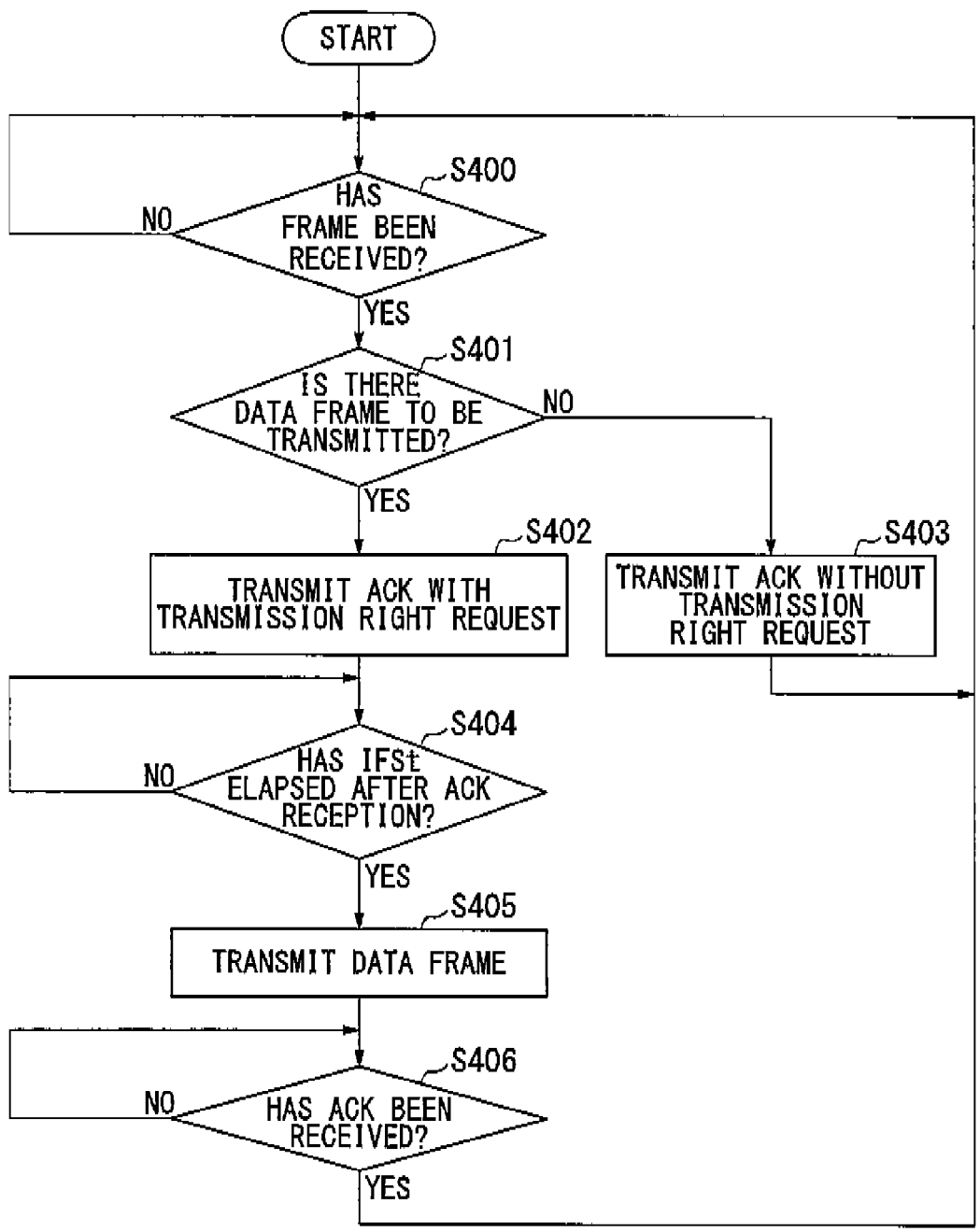
FIG. 22 is a flowchart showing a procedure of the operation (the third operation example) of the printer according to an embodiment of the present invention.

FIG. 22 shows an operation of the printer 20 after establishing the connection to the electronic camera 10.

When a radio frame is received from the electronic camera 10 during the operation shown in FIG. 22, the communication control section 202 stores the radio frame in the RAM 204. Data to be transmitted is stored in the RAM 204 by the CPU 200. The communication control section 202 performs transmission by dividing the data into frames (data frames) having a predetermined size. First, the communication control section 202 determines whether or not a radio frame has been received (step S400).

When the radio frame has not been received, the communication control section 202 repeats the determination of step S400. When the radio frame has been received, the communication control section 202 determines whether or not a data frame intended to be transmitted to the electronic camera 10 exists (step S401).

When a data frame intended to be transmitted to the electronic camera 10 does not exist, the communication control section 202 transmits an ACK frame, in which "0" is set in the transmission right request information, to the electronic camera 10 by wireless communication (step S403). Subsequently, the communication control section 202 repeats the determination of step S400.

When the data frame intended to be transmitted exists, the communication control section 202 transmits an ACK frame, in which "1" is set to the transmission right request information to the electronic camera 10, by wireless communication (step S402). Subsequently, the process proceeds to step S404. Since the process of steps S404 to S406 is the same as the process of steps S204 to S206 of FIG. 16, a description thereof is omitted.

As described above, when IFSt has elapsed after transmitting the ACK frame indicating the transmission right request information (step S404), the printer 20 is able to transmit a data frame (step S405).

<Fourth Operation Example>

Figure 23:
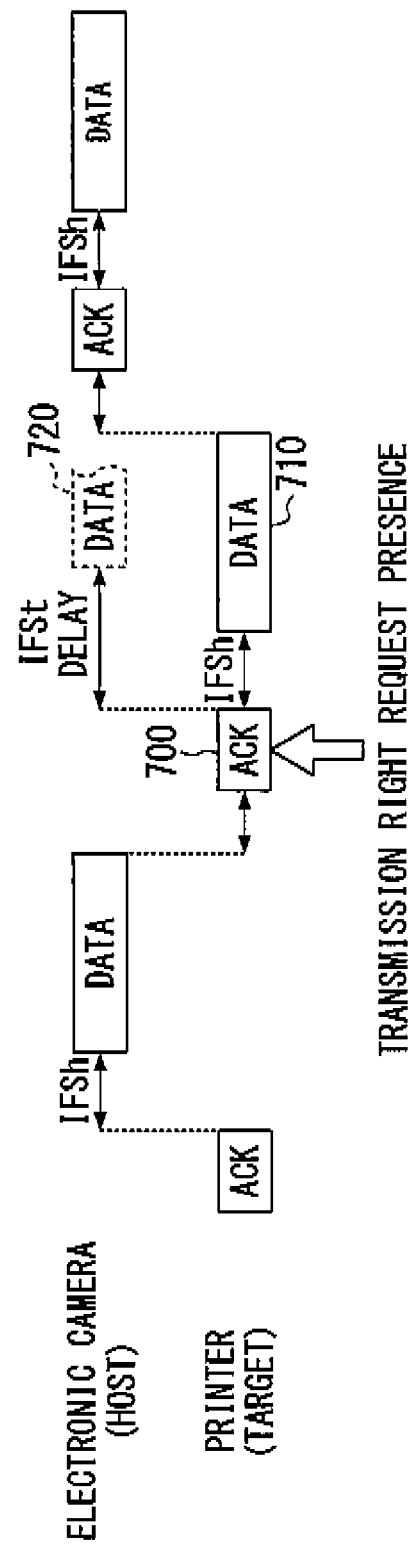
FIG. 23 is a reference diagram showing operations (a fourth operation example) of the electronic camera and the printer according to an embodiment of the present invention.

Next, a fourth operation example will be described. FIG. 23 shows operations of the electronic camera 10 and the printer 20 according to the fourth operation example. The difference from the third operation example shown in FIG. 20 is that the frame transmission interval is changed to IFSh until a data frame 710 is transmitted after the printer 20 transmits an ACK frame 700 indicating a transmission right request to the electronic camera 10.

When IFSh has elapsed after transmitting the ACK frame 700, the printer 20 transmits the data frame 710 to the electronic camera 10. Since the data frame 710 is received before IFSt has elapsed after receiving the ACK frame 700, the electronic camera 10 may not transmit a data frame 720. If the printer 20 does not transmit the data frame 710, the electronic camera 10 is able to transmit the data frame 720.

According to the above operation, when an ACK frame indicating a transmission right request has been transmitted, the printer 20 changes the frame transmission interval from IFSt to IFSh, so that the printer 20 is able to transmit a data frame by taking an opportunity to transmit data. The printer 20 may change the frame transmission interval to a shorter time interval than IFSh. Thereby, the data transmission collision between the electronic camera 10 and the printer 20 may be avoided more reliably. As another method of providing the data transmission opportunity for the printer 20, the printer 20 may change the frame transmission interval from IFSt to IFSh at an arbitrary timing without transmitting the ACK frame indicating the transmission right request.

The detailed operation of the electronic camera 10 is the same as the operation shown in FIG. 21. The detailed operation of the printer 20 is the same as the operation shown in FIG. 22, but they are different in that the time to be used for the determination of step S404 is IFSh, not IFSt.

Figure 24:
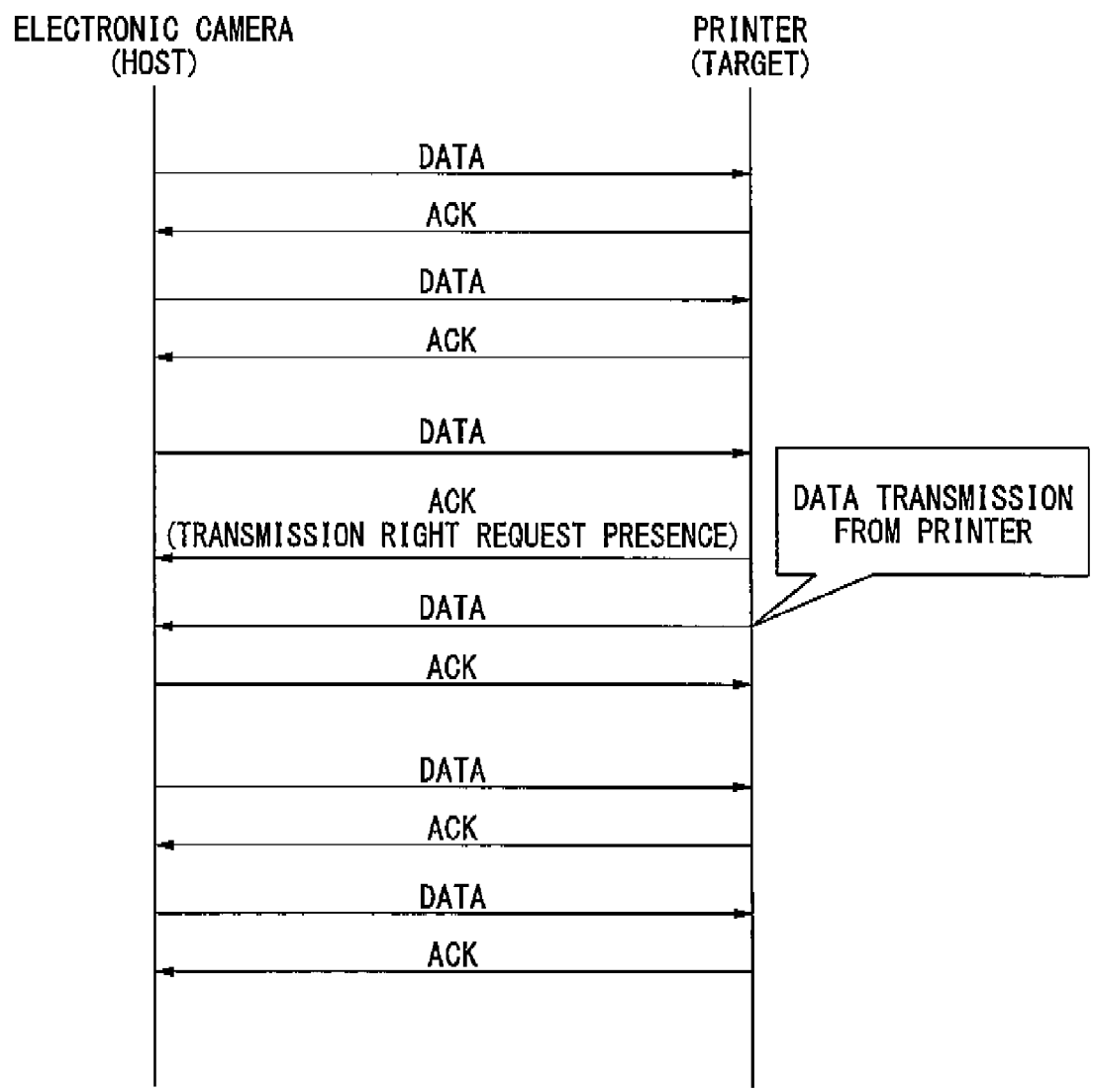
FIG. 24 is a sequence diagram showing operations (the third and fourth operation examples) of the electronic camera and the printer according to an embodiment of the present invention.

FIG. 24 shows communication sequences of the electronic camera 10 and the printer 20 according to the third and fourth operation examples. The electronic camera 10 continuously transmits a data frame to the printer 20. When a data frame intended to be transmitted exists, the printer 20 is able to transmit the data frame to the electronic camera 10 after transmitting the ACK frame indicating the transmission right request to the electronic camera 10.

According to this embodiment as described above, since at least one of the electronic camera 10 and the printer 20 is able to change a frame transmission interval and change the priority of data transmission, the printer 20 is able to transmit data to the electronic camera 10 even when data is continuously transmitted from the electronic camera 10 to the printer 20. In the case where the printer 20 must transmit an ACK frame so as to take an opportunity to transmit data, the priority relationship between data transmission by the electronic camera 10 and data transmission by the printer 20 is not reversed all in all, since the printer 20 does not have a larger number of data transmission opportunities than the electronic camera 10.

That is, the present invention is able to change a required time before a radio frame is transmitted to a communication counterpart after transmitting a radio frame to the communication counterpart of wireless communication or receiving a radio frame from the communication counterpart. Consequently, even when data transmission is continuously performed in one direction, it is possible to transmit data in a reverse direction to the data transmission.

The embodiments of the present invention have been described in detail with reference to the drawings. However, specific configurations are not limited to the embodiments and may include any design change in the scope without departing from the subject matter of the present invention.

What is claimed is:

1. A wireless communication terminal, wherein
there are radio frames, a message type of some radio frames being "data", a message type of other radio frames being "reception response",
a radio frame of which the massage type is "data" is defined to as a data frame, a radio frame of which the massage type is "reception response" is defined to as an ACK frame,
an interval, during which the data frame cannot be transmitted to a counterpart device of a wireless communication counterpart after transmitting a radio frame to the counterpart device or after receiving a radio frame from the counterpart device, is defined as a frame transmission interval, a frame transmission interval of host (IFSh) and a frame transmission interval of target (IFSt) are defined in the frame transmission interval, it is defined that the frame transmission interval of host (IFSh) is shorter than the frame transmission interval of target (IFSt), and the wireless communication terminal comprises:
- a processor that instructs whether a wireless communication serves as host or target;
- a wireless communication interface that transmits/receives the radio frame to/from a terminal serving as target when receiving an instruction from the processor to serve as host, the wireless communication interface transmitting/receiving the radio frame to/from a terminal serving as host when receiving an instruction from the processor to serve as target and sets the frame transmission interval of host as the frame transmission interval when receiving an instruction from the processor to serve as host, the wireless communication interface setting the frame transmission interval of target as the frame transmission interval when receiving an instruction from the processor to serve as target, the wireless communication interface transmitting a radio frame, which changes the frame transmission interval to the frame transmission interval of target or a frame transmission interval longer than the frame transmission interval of target, to a terminal serving as host when the frame transmission interval of target is set.

2. The wireless communication terminal according to claim 1, wherein
the wireless communication interface transmits the radio frame when responding to a data frame received from the terminal serving as host if the frame transmission interval of target has been set.

3. The wireless communication terminal according to claim 1, wherein
the wireless communication interface changes the frame transmission interval to the frame transmission interval of host or a frame transmission interval shorter than the frame transmission interval of host after transmitting the radio frame if the frame transmission interval of target has been set.

4. The wireless communication terminal according to claim 1, wherein
the wireless communication interface transmits a radio frame, which changes the frame transmission interval to the frame transmission interval of target or a frame transmission interval longer than the frame transmission interval of target, to the terminal serving as target if the frame transmission interval of host has been set.

5. The wireless communication terminal according to claim 4, wherein
the wireless communication interface transmits a probe message frame as the radio frame to the terminal serving as target if the frame transmission interval of host has been set.

6. The wireless communication terminal according to claim 4, wherein
the wireless communication interface transmits the radio frame at a predetermined interval to the terminal serving as target if the frame transmission interval of host has been set.

7. The wireless communication terminal according to claim 4, wherein
the wireless communication interface changes the frame transmission interval to the frame transmission interval of target or a frame transmission interval longer than the frame transmission interval of target after transmitting the radio frame if the frame transmission interval of host has been set.

* * * * *